United States Patent [19]

Seiersen

[11] Patent Number: 5,335,163
[45] Date of Patent: Aug. 2, 1994

[54] POWER SUPPLY CIRCUIT WITH INTEGRATED MAGNETIC COMPONENTS

[75] Inventor: Ole S. Seiersen, Hørsholm, Denmark
[73] Assignee: Scanpower, Horsholm, Denmark
[21] Appl. No.: 50,499
[22] Filed: May 13, 1993
[51] Int. Cl.$^5$ .................... H02M 1/14; H02M 7/06; H01F 27/24
[52] U.S. Cl. .................... 363/126; 336/178; 336/212; 323/362; 363/45; 363/91
[58] Field of Search ............... 363/44–48, 363/82, 90, 91, 126, 16–26; 323/355, 356, 357, 358, 359, 362, 363; 336/178, 184, 212

[56] References Cited

U.S. PATENT DOCUMENTS

| | | | |
|---|---|---|---|
| 3,231,841 | 1/1966 | Masayasu | 336/165 |
| 4,581,690 | 4/1986 | Russell | 363/17 |
| 4,766,365 | 8/1988 | Bolduc et al. | 323/308 |
| 4,774,649 | 9/1988 | Archer | 363/20 |
| 4,899,271 | 2/1990 | Seiersen | 363/126 |
| 4,914,561 | 4/1990 | Rice et al. | 363/126 |

*Primary Examiner*—Steven L. Stephan
*Assistant Examiner*—Y. Jessica Han
*Attorney, Agent, or Firm*—Willian Brinks Hofer Gilson & Lione

[57] ABSTRACT

A magnetic circuit with several magnetic components integrated on one or more common magnet cores is utilized in a current supply circuit known per se. The circuit comprises a transformer, the secondary winding ends of which are connected to uniform electrodes of a pair of rectifier diodes, the second electrodes of which are connected to one output terminal of the power supply circuit. Additionally, it includes two reactive components, and the first electrodes of the diodes are connected to the second output terminal of the power supply circuit via one of the reactive components. The number of turns of the two reactive components is essentially chosen to equal the number of secondary turns on the transformer. The two reactive components are positioned on each separate core part so that the resulting magnetic flux in common core parts substantially equals the difference between the magnetic flux of the two core parts, and the secondary winding of the transformer is positioned on the common core parts.

5 Claims, 2 Drawing Sheets

POWER SUPPLY CIRCUIT WITH INTEGRATED MAGNETIC COMPONENTS

BACKGROUND OF THE INVENTION

The invention concerns a power supply circuit of the kind known from the applicant's U.S. Pat. No. 4,899,271 and use of a magnetic circuit with a number of magnetic components integrated on one or more common magnet cores of such a circuit.

The known circuit i.a. comprises a transformer and two reactive components, e.g. choke coils. The three magnetic components are relatively expensive to produce and in addition a disproportionately large amount of core material is required when the three magnetic components are produced separately.

It has been a long-felt desire to be able to cut down on costs and reduce the amount of core material by integrating the three magnetic components on a common magnet core. However, until now this has been impossible as the voltage curve forms do not match for which reason the flux account does not tally. Further, a transformer's magnetizing current normally causes certain problems, as besides entailing increased loss it may also interact with the load current at low loads and thereby create unfortunate imbalance situations in the power supply circuit.

However, a certain economy has been achieved, as stated in the above patent specification, by integrating the two choke coils on the same core. e.g. by placing each of the choke coils on the outer legs of an E-core. Each of these outer legs must, however, then be provided with an air gap to avoid saturation of the core material, whereas the central leg must be without air gap to avoid coupling between the two choke coil circuits.

Other examples are known where several magnetic components are integrated on a common core, as is the case e.g. with a 3-phase transformer; however, in these cases the curve forms of the flux of the components are uniform but phase displaced so that the flux account tallies.

SUMMARY OF THE INVENTION

It is the object of the invention to provide a construction allowing the three magnetic components in the power supply circuit known from U.S. Pat. No. 4,899,271 to be positioned on one or more common magnet cores in order to cut down on production costs and reduce the amount of core material used.

According to the invention this object is achieved by integrating the three magnetic components on one or more common magnet cores, selecting the number of turns of the two choke coils so as to essentially match the number of secondary turns on the transformer, and positioning the two choke coils on each separate core part in such a way that the resulting magnetic flux in a common core part on which the transformer windings are positioned essentially equals the difference between the magnetic flux of the two core parts.

It has been found that the magnetizing current of the transformer hereby can be generated by the integrated choke coils which furthermore determine the magnetic cross-sectional area of the common magnet core, whereas the transformer does not require additional magnetic material.

As stated in claim 3 use may advantageously be made of a so-called E-core where the choke coils are positioned on the outer legs and the transformer on the central leg.

As stated in claim 4 an E-core can be composed of a combination of ferrite and amorphous material which makes feasible greater DC-flux in the outer legs and greater AC-flux in the central leg.

As stated in claim 5, use may also be made of two toroid cores where the two choke coils are wound on each separate toroid core, whereas the transformer is wound through both cores.

BRIEF DESCRIPTION OF THE DRAWINGS

In the following the invention will be described in more detail, reference being made to the drawing, in which.

DETAILED DESCRIPTION OF THE PREFERRED EMBODIMENTS

Figure 1:
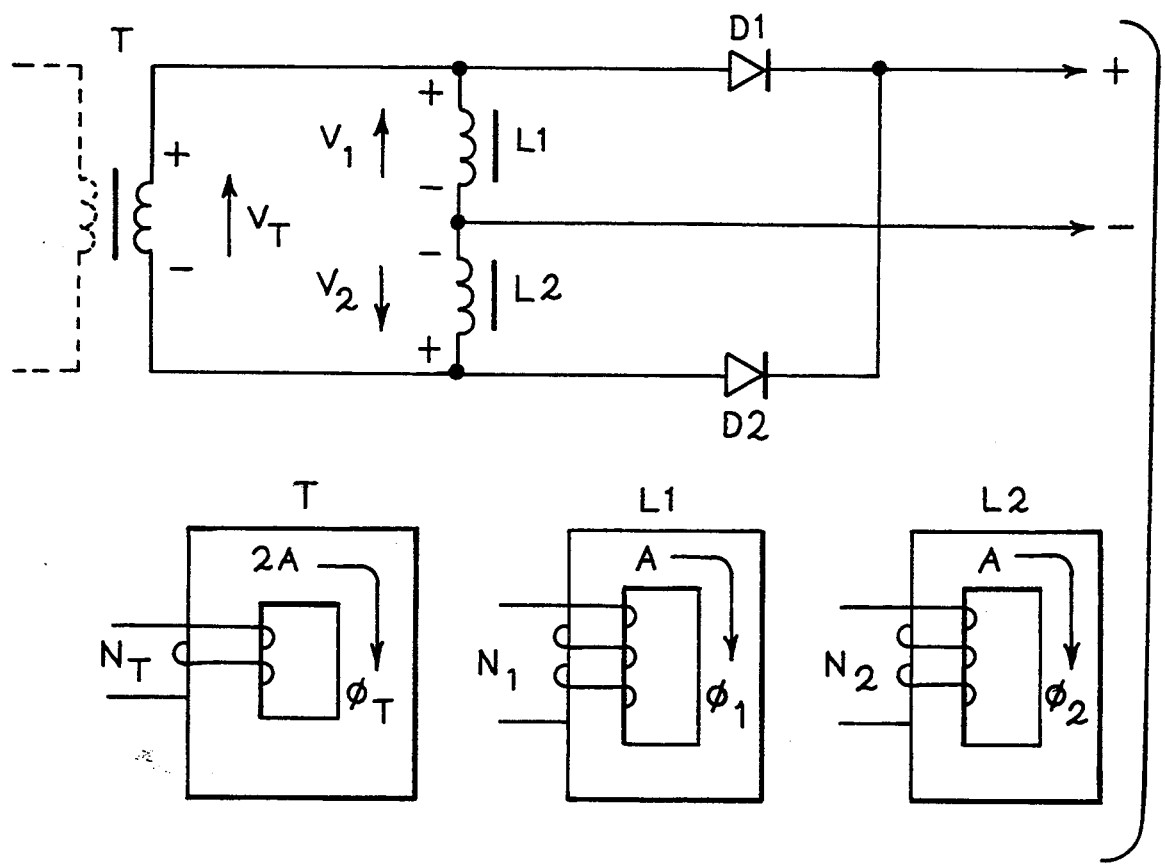
FIG. 1 shows a variant of the power supply circuit disclosed in U.S. Pat. No. 4,899,271 and the appertaining magnetic circuits of the transformer and the two choke coils.

The power supply circuit disclosed in U.S. Pat. No. 4,899,271 is shown in FIG. 1. Initially, its mode of operation will be explained.

The circuit comprises a transformer T, two choke coils L1, L2, two rectifier diodes D1, D2 and a positive and a negative output terminal.

When the secondary voltage $V_T$ from the transformer T is positive, this voltage will force the rectifier D1 to be conductive. Consequently, a current will flow from the negative output terminal through L2, the secondary winding of the transformer, the rectifier D1 onto the positive output terminal.

When the secondary voltage $V_T$ vanishes ($V_T=0$) in the dead periods, the current in L2 will continue to flow (free-wheel), this time from the negative output terminal through D2 and onto the positive output terminal.

If the secondary voltage $V_T$ becomes negative, this voltage forces a current to flow from the negative output terminal through L1, the secondary winding and the rectifier D2, which is already conductive due to the free-wheeling current from L2. Thus, now both a free-wheeling current from L2 and a current through the secondary winding and L1 will flow onto the positive output terminal.

When the secondary voltage $V_T$ vanishes again ($V_T=0$) both the current from L1 and L2 will continue to free-wheel through D1 and D2, respectively, both of which will consequently be conductive.

In other words, the circuit maintains a continuous (not pulsating) current flowing from the negative to the positive output terminal, irrespective of the instantaneous value of the transformer secondary voltage.

At the bottom of the figure are shown the magnetic circuits of each of the three magnetic components T, L1, L2.

As the two choke coils are serially connected directly across the terminals of the secondary winding it follows that the sum of the instantaneous voltages across these choke coils must equal the instantaneous value of the secondary voltage, i.e.

$$V_T(t) = V_1(t) - V_2(t) \quad (1)$$

with polarities as shown in FIG. 1.

Below the magnetic flux in the various parts of the transformer and the choke coils is considered. From Faraday's Law it is known that:

$$V = N \frac{d\phi}{dt},$$

where $\phi$ designates the flux, N the number of turns and V the voltage. For the transformer with the secondary number of turns $N_T$ it thus follows that:

$$V_T = N_T \frac{d\phi_T}{dt}$$

Correspondingly, for the choke coil L1 with the number of turns $N_1$ it follows that:

$$V_1 = N_1 \frac{d\phi_1}{dt}$$

and finally for L2 with number of turns $N_2$ that:

$$V_2 = N_2 \frac{d\phi_2}{dt}$$

Thus equation (1) can now be written:

$$N_T \frac{d\phi_T}{dt} = N_1 \frac{d\phi_1}{dt} - N_2 \frac{d\phi_2}{dt}$$

If L1 and L2 are adapted to have the same number of turns ($N_1 = N_2 = N$), then:

$$N_T \frac{d\phi_T}{dt} = N(d\phi_1 - d\phi_2)/dt = N d(\phi_1 - \phi_2)/dt$$

As disclosed in U.S. Pat. No. 4,899,271 the two choke coils can be integrated together e.g. by positioning each of them on the outer legs of an E-core.

Figure 2:
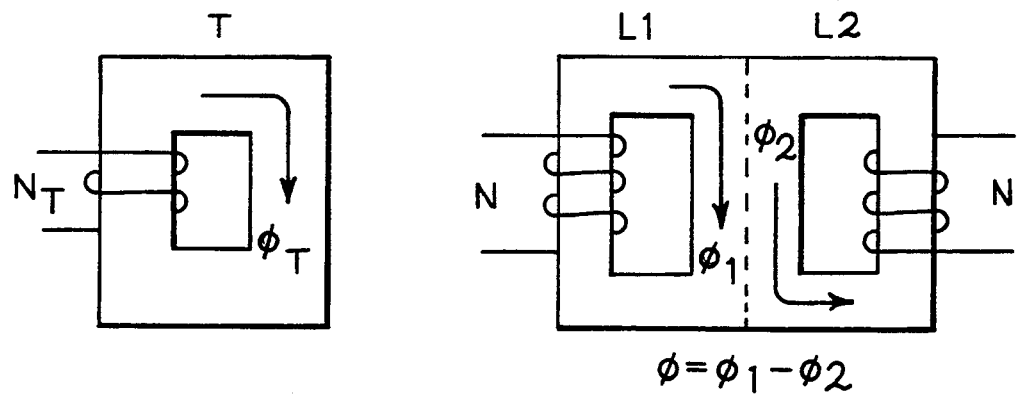
FIG. 2 shows the magnetic circuits of the transformer and the two choke coils, respectively, the latter being integrated on a common core.

Dependent upon how the integrated choke coils are interpolarized, it is achievable that the flux in the central leg either will be the total of or the difference between the flux of the outer legs. By the polarization shown in FIG. 2 is achieved that the flux of the central leg will be $\phi = \phi_1 - \phi_2$, and consequently it follows that:

$$\frac{d\phi}{dt} = \frac{d(\phi_1 - \phi_2)}{dt} => N_T \frac{d\phi_T}{dt} = N \frac{d\phi}{dt}$$

If the number of turns is then chosen to be $N = N_T$, it follows that $$\frac{d\phi_T}{dt} = \frac{d\phi}{dt} = d(\phi_1 - \phi_2)/dt$$

Thus, it is seen that when the number of turns is chosen as above, and the choke coils are polarized as described, the flux of the transformer equals the flux which has already been provided in the central leg by the choke coils. This means that the transformer can now be integrated into the central leg of the combined L1-L2 choke coil without this calling for any increase of the cross-section of the core or any magnetization current in the transformer.

Figure 3:
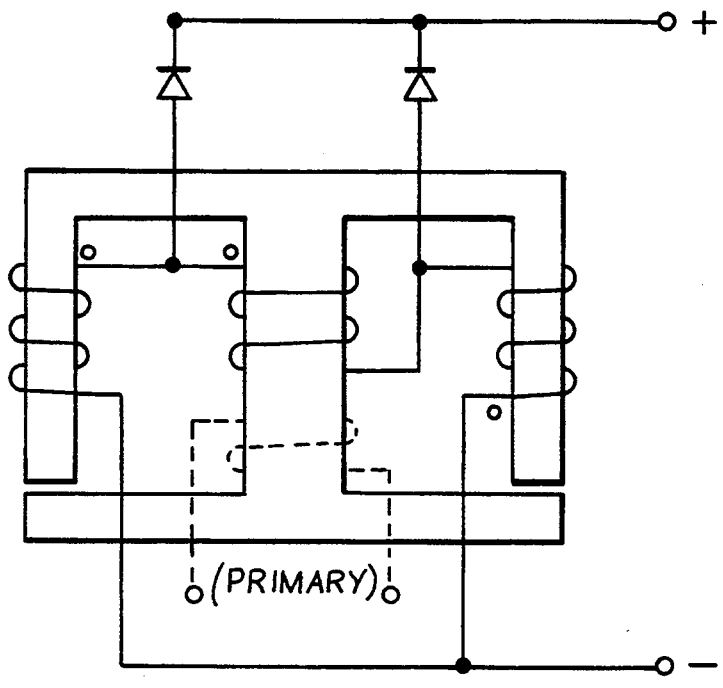
FIG. 3 shows the integrated magnetic circuit according to the invention, and FIGS. 4a and 4b an embodiment in which the core is composed of a combination of ferrite and amorphous, tape wound magnetic material.

In FIG. 3 this has been done on an E-core. The interpolarity of the windings are shown in the figure by black dots. The primary winding of the transformer, indicated by stippled line, calls for no polarization relatively to the other windings.

However, in some cases it may be desirable to use a somewhat smaller number of turns on the central leg, thereby—intentionally—creating a certain imbalance in the magnetic circuit. In certain cases such imbalance can reduce the ripple component in the choke coils. However, the differences in the number of turns are negligent.

Figure 4A:
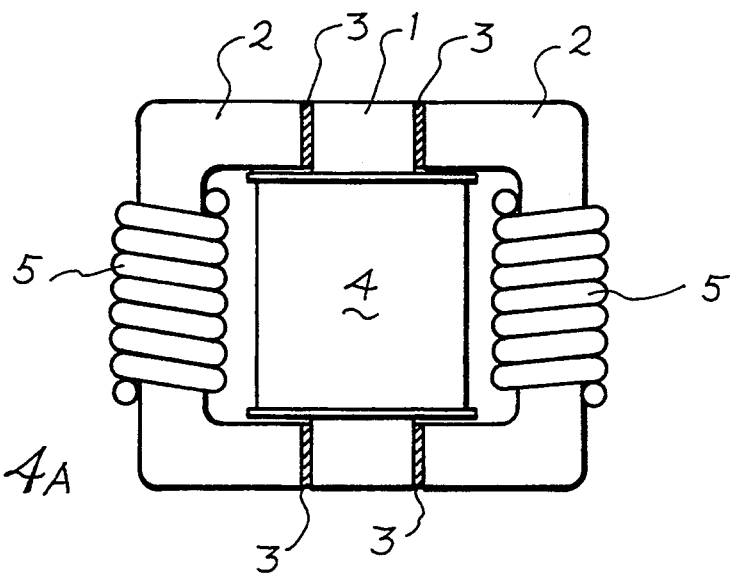
Figure 4B:
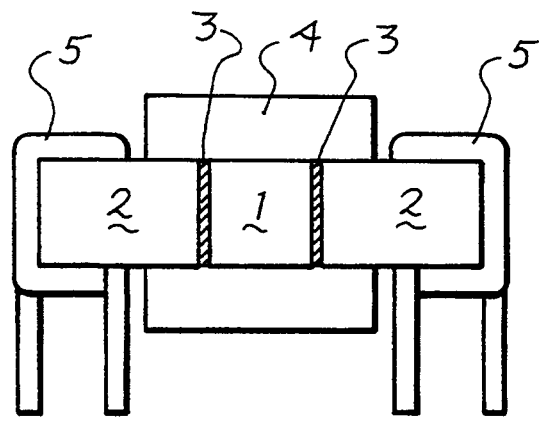

FIGS. 4a and 4b show an embodiment in which the core is composed of a combination of ferrite and amorphous tape wound magnetic material. The magnetic system comprises a core part 1 of ferrite, two core parts 2 of amorphous cut tape core, air gaps 3, a transformer winding 4 and choke coil windings 5.

Like laminated iron cores amorphous magnetic materials can sustain a far higher DC-magnetizing level than ferrite. Saturation does not occur until at 1–1.5 Tesla as opposed to ferrite where saturation occurs at 0.3–0.4 Tesla.

Consequently, it is particularly advantageous to use one of the amorphous materials for outer legs in the core where the magnetization preferably consists of DC-flux.

Here a so-called cut tape core has been used, i.e. a core wound from amorphous material in tape form, which has subsequently been cut in two halves.

In the central leg of the core the DC-flux of the outer legs will be outbalanced, whereas the flux variations will be added and entail a higher AC-flux density than in the outer legs.

Consequently, here use is most advantageously made of ferrite, as ferrite typically will be the least lossy material.

The air gaps shown in the figure can e.g. be provided by spacers of insulation material onto which the individual core parts may optionally be glued.

The core parts can also e.g. be tightened together by means of a tape of a non-conductive material. A conductive material could cause eddy current loss in such areas of the tightening tape which are close to the air gaps.

The magnetic circuit can also be provided with other core types than the previously mentioned E-core. E.g. low permeable toroid cores (powder cores) may be used. The two choke coils are then merely wound on each separate toroid core, while the transformer is wound through both cores.

I claim:

1. A magnetic circuit having several magnetic components integrated on one or more common magnet cores of a power supply circuit comprising: a transformer, secondary winding ends of which are connected to uniform, first electrodes of a pair of rectifier diodes, second electrodes of which are connected to one output terminal of the power supply circuit, and further including two reactive components, and the first electrodes of the diodes further being connected to a second output terminal of the power supply circuit via a respective one of the reactive components, where a number of turns of the two reactive components substantially is selected so as to equal a number of secondary turns on the transformer, the two reactive components are positioned on each separate core part so that resulting magnetic flux in common core parts substantially equals a difference between magnetic flux of the core parts, and a primary winding and the secondary winding of the transformer are positioned on the common core parts.

2. A power supply circuit comprising: a transformer having secondary winding ends which are connected to uniform, first electrodes of a pair of rectifier diodes, second electrodes of which are connected to one output terminal of the power supply circuit, and further including two reactive components, and the first electrodes of the diodes further being connected to a second output terminal of the power supply circuit via a respective one of the reactive components, wherein all magnetic components are integrated on one or more common magnet cores, where a number of turns of the two reactive components substantially equals a number of secondary turns on the transformer, and the two reactive components are positioned on each separate core part such that resulting magnetic flux in common core parts, on which a primary winding and the secondary winding of the transformer are positioned, essentially equals a difference between magnetic flux of those core parts.

3. A power supply circuit according to claim 2 comprising a common core part, wherein the magnetic components are integrated on a common E-type magnet core, the two reactive components being positioned on outer legs of the core, and the common core part being constituted by a central leg of the core.

4. A power supply circuit according to claim 3, wherein the outer legs are composed of an amorphous tape wound material, wherein the central leg is composed of a ferrite material and wherein air gaps are provided at locations where two materials adjoin.

5. A power supply circuit according to claim 1, comprising two common core parts, wherein the magnetic components are positioned on two common toroid cores, two reactive components being positioned on each separate toroid core, and a primary winding and the secondary winding of the transformer being wound through both cores.

* * * * *

UNITED STATES PATENT AND TRADEMARK OFFICE
CERTIFICATE OF CORRECTION

PATENT NO. : 5,335,163
DATED : August 2, 1994
INVENTOR(S) : Ole S. Seiersen

It is certified that error appears in the above-indentified patent and that said Letters Patent is hereby corrected as shown below:

<u>On the Title Page</u>

Please add the following information to the title page:

--Foreign Application Priority Data

| | | |
|---|---|---|
| PCT | PCT/DK91/00341 | 11/13/91 |
| DENMARK | 2718/90 | 11/14/90-- |

Signed and Sealed this

Twenty-fourth Day of October, 1995

Attest:

BRUCE LEHMAN

Attesting Officer

Commissioner of Patents and Trademarks